US012145245B2

(12) United States Patent
Springwater

(10) Patent No.: US 12,145,245 B2
(45) Date of Patent: Nov. 19, 2024

(54) SEATDRIVER

(71) Applicant: Gary D Springwater, Rogers, AR (US)

(72) Inventor: Gary D Springwater, Rogers, AR (US)

( * ) Notice: Subject to any disclaimer, the term of this patent is extended or adjusted under 35 U.S.C. 154(b) by 27 days.

(21) Appl. No.: 17/817,978

(22) Filed: Aug. 5, 2022

(65) Prior Publication Data

US 2024/0042585 A1 Feb. 8, 2024

(51) Int. Cl.
*B25B 27/24* (2006.01)
*E03B 7/07* (2006.01)

(52) U.S. Cl.
CPC .............. *B25B 27/24* (2013.01); *E03B 7/077* (2013.01)

(58) Field of Classification Search
CPC ....... B25B 27/24; B25B 27/143; B25B 27/18; B25B 27/0028; Y10T 137/6109; Y10T 137/6154; Y10T 137/6157; F16B 23/0007
See application file for complete search history.

(56) References Cited

U.S. PATENT DOCUMENTS 1,371,956 A * 3/1921 Warren .................. B60C 27/04 152/228
1,467,936 A * 9/1923 Janssen .................. B25B 13/48 81/176.15
2,106,741 A * 2/1938 Herbert ................. B25B 27/143 81/441
3,760,659 A * 9/1973 Campbell .......... H05K 13/0007 81/176.15
5,586,571 A * 12/1996 Guillermo ............... B25B 5/147 137/15.17
10,967,488 B2 * 4/2021 Kukucka ............. F16B 23/0069
2003/0041430 A1 * 3/2003 Morrison ................ B25B 27/24 29/227
2015/0283689 A1 * 10/2015 Weaver ................. B25B 27/062 29/890.121
2018/0354102 A1 * 12/2018 Kukucka ................. B25B 23/08
2021/0316430 A1 * 10/2021 Poehls .................... B25B 27/24

* cited by examiner

*Primary Examiner* — Reinaldo Sanchez-Medina

(57) ABSTRACT

The present invention is a novel backflow meter "Seat-driver" apparatus which is much like a screwdriver. Its novel direct connection of the "Seat Head" slot, "Driver Shaft" and the "Driver Handle" work together creating one apparatus known as the "Seatdriver" allowing for easy installation and removal of backflow valve seats. This apparatus functions as a two in one device providing a check valve seat connector on one end and a relief valve seat connector on the other end. The "Seatdriver" channels on the handle matches the seat part profile which reduces the "Camming Out" effect which in turn increases the hand torque force, increases thread alignments, and holds the valve part in place during the replacement.

4 Claims, 7 Drawing Sheets

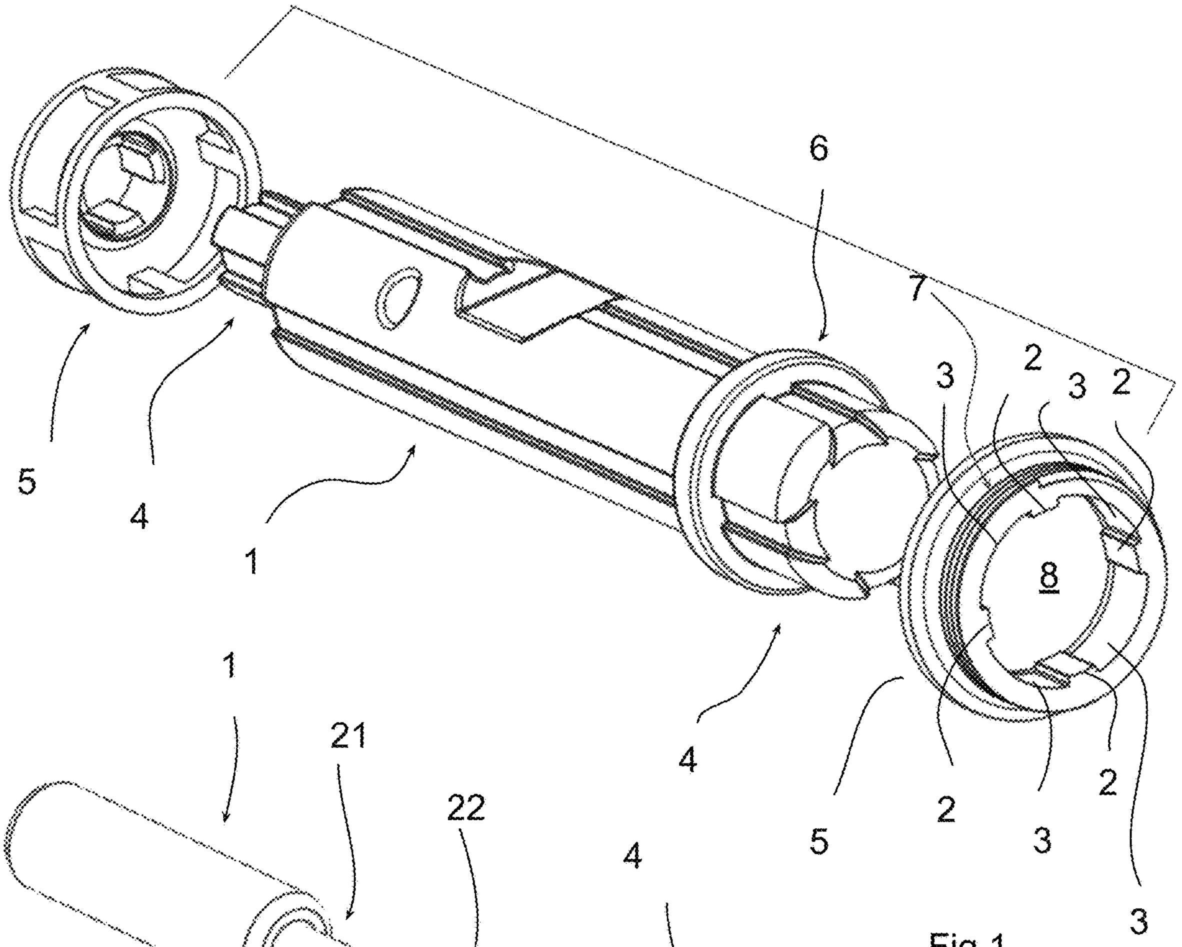
Fig.1
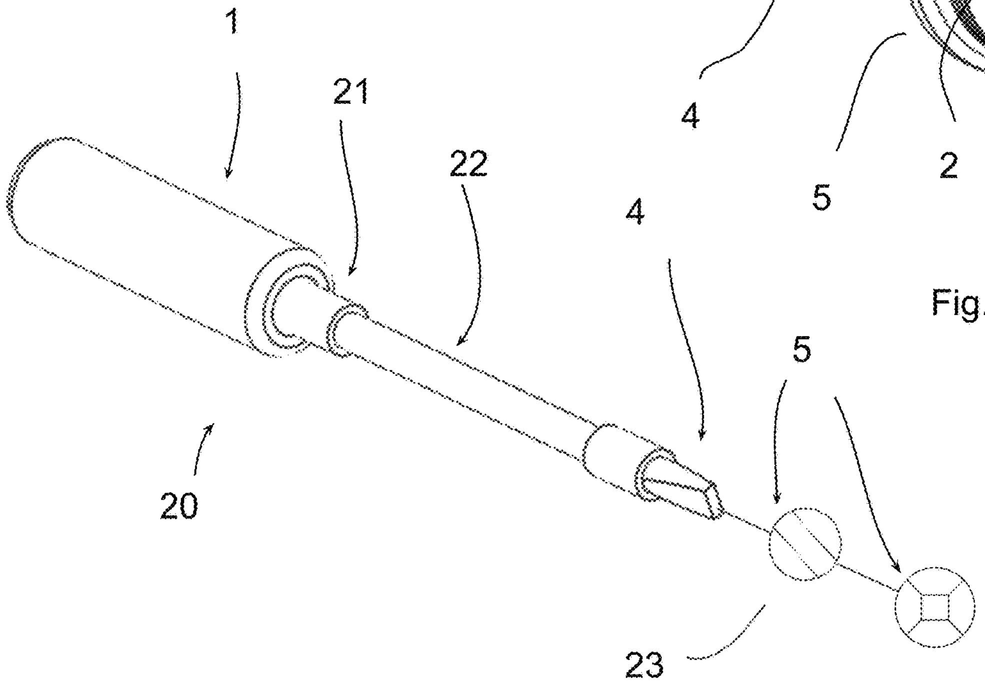
Fig.2 -Prior Art

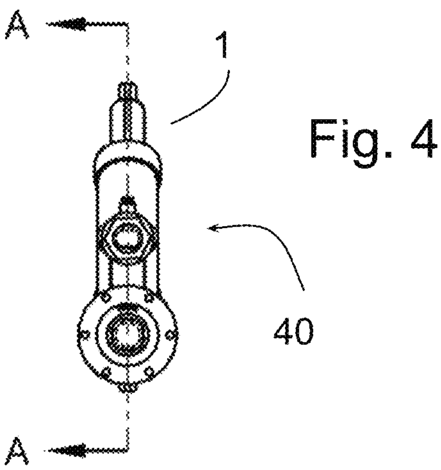
Fig. 4
Fig 5
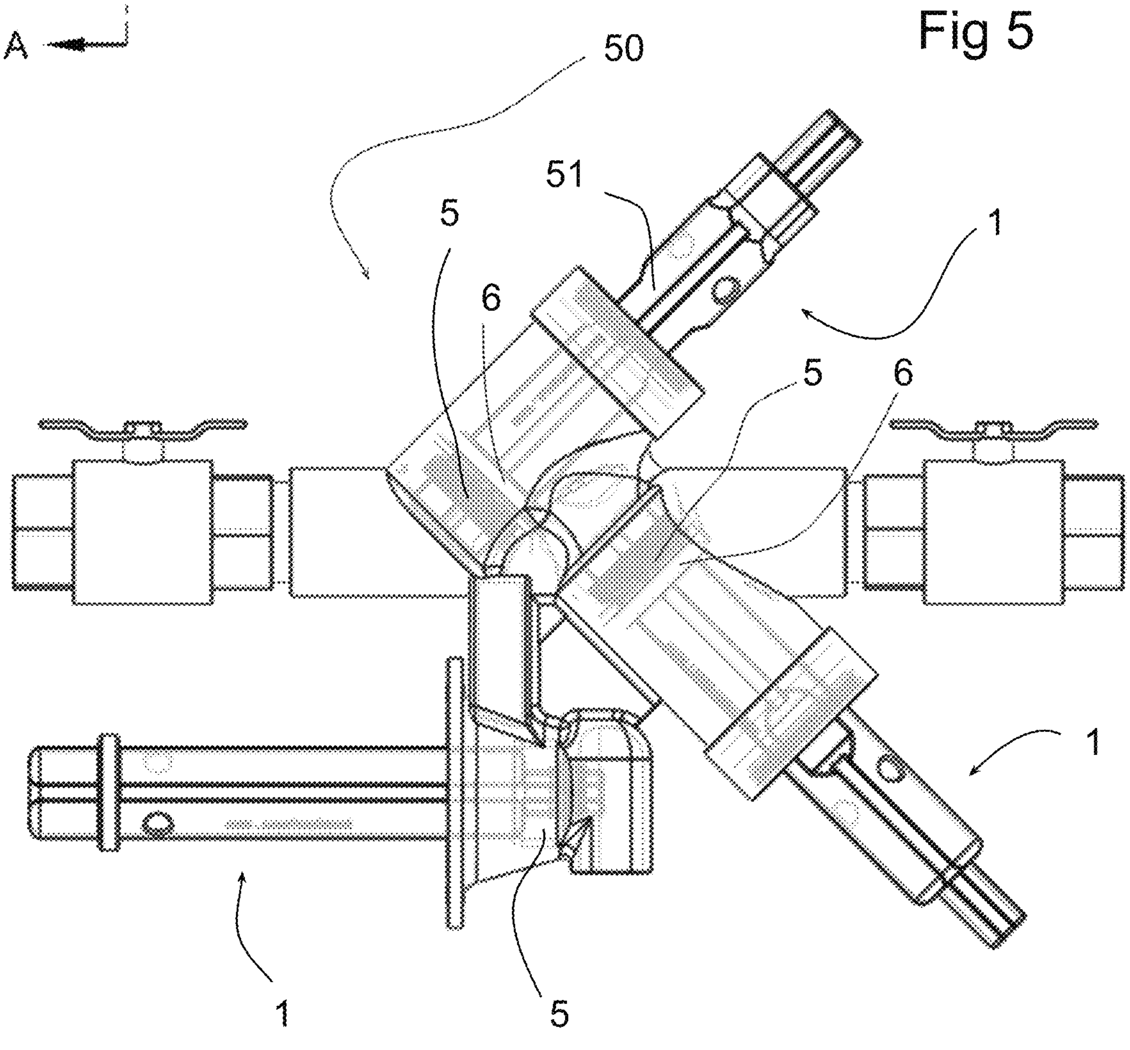

Fig 8
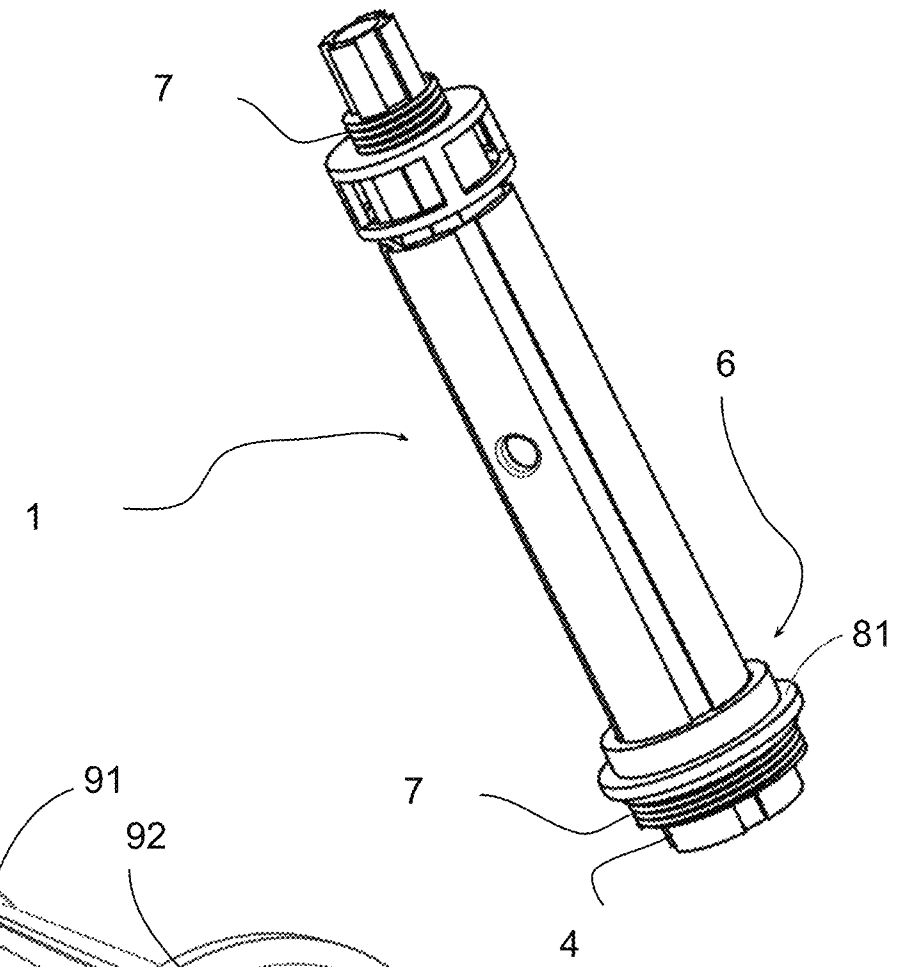
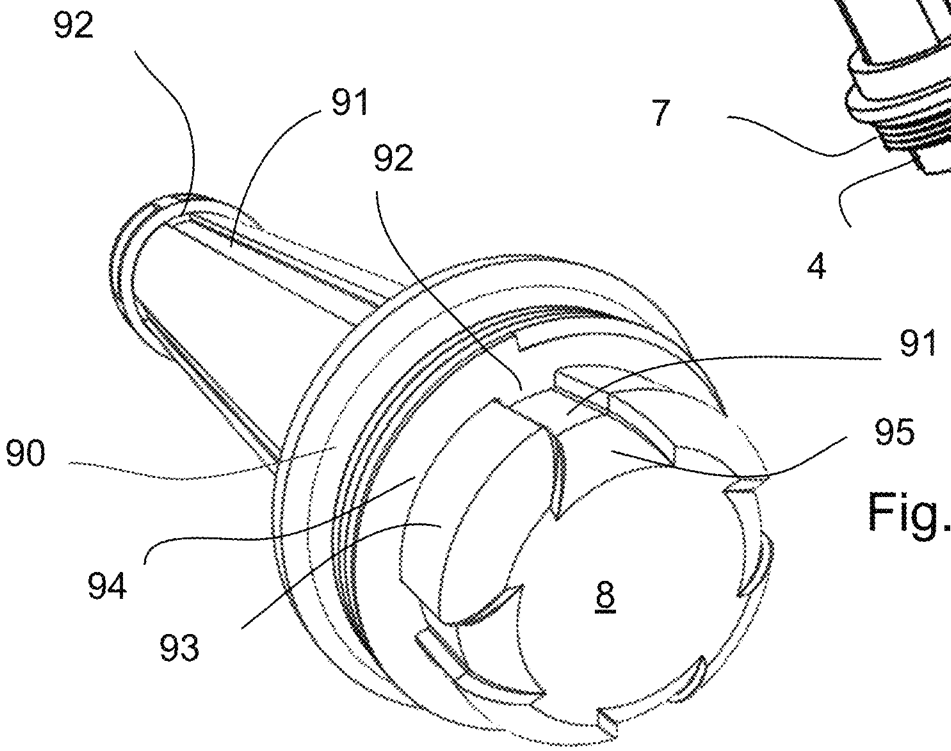
Fig. 9

Fig 10
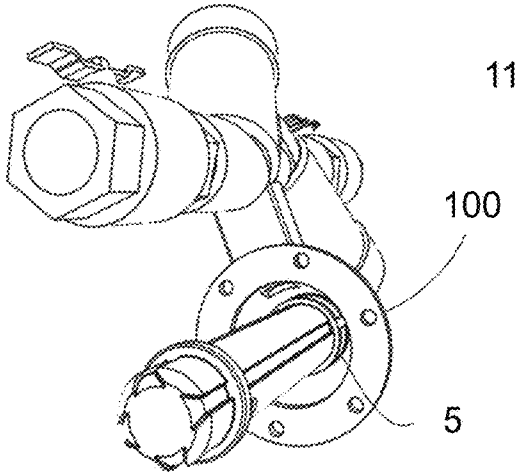
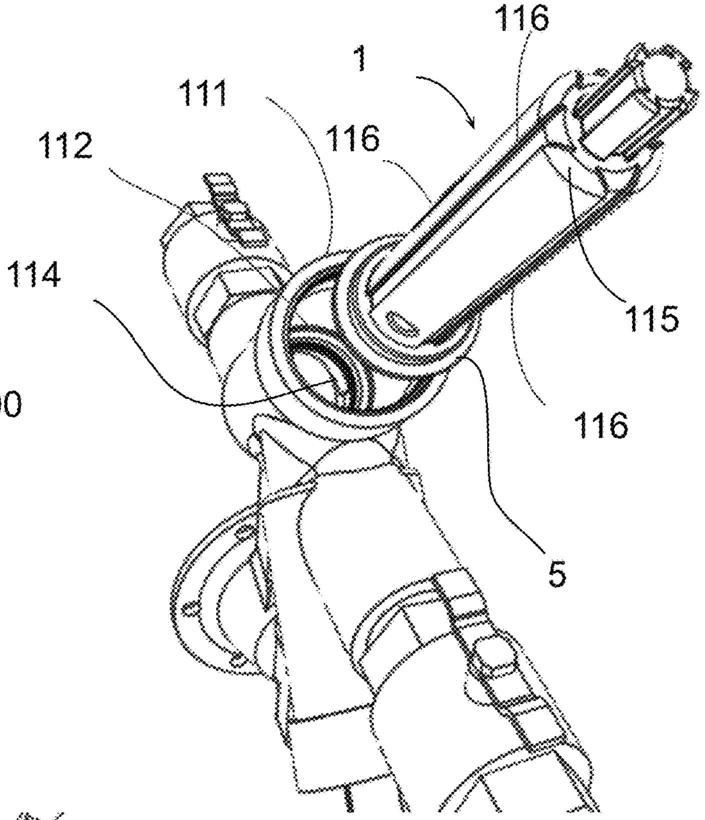
Fig. 11
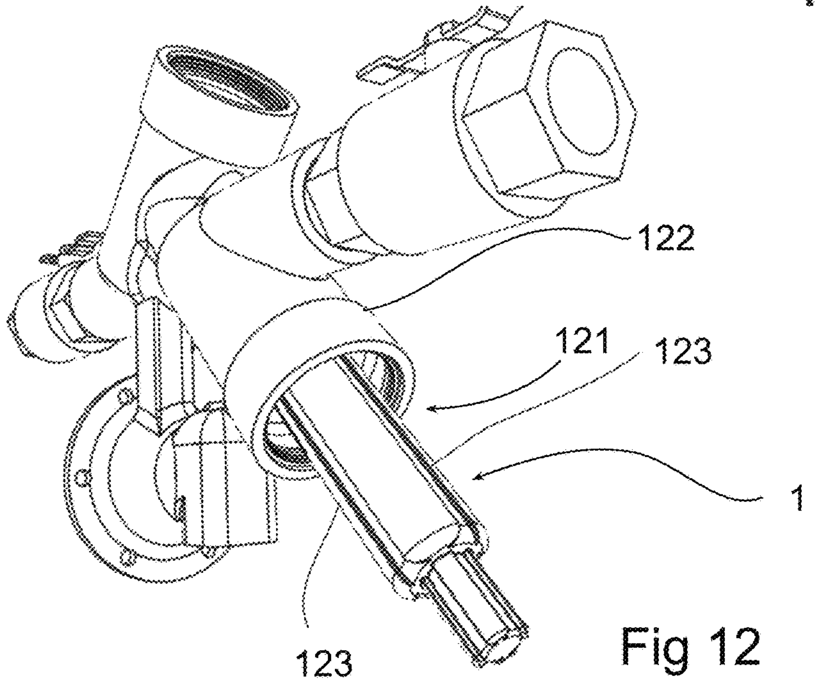
Fig 12

SEATDRIVER

FIELD OF THE INVENTION

The present invention is a novel backflow "Seatdriver" apparatus which allows for easy removals and proper installments of vital seat part replacements for RPZ meters. A two in one apparatus. One end of the apparatus will be used to remove, to properly align the threads and to properly install the relief valve seat parts. The other end of the tool will be used to remove, to properly align the threads and to properly install the hard to reach check valve seat parts.

BACKGROUND

The Clean Water Act (CWA) is the primary federal law governing water pollution and requires many actions to protect our drinking water. Backflow prevention is a vital part of the CWA for the protection and keeping of safe drinking water. This backflow prevention is accomplished through a mechanical assembly protection device used to prevent a negative or reverse flow (known as backflow) to prevent non potable (non-safe drinking water) from back flowing into potable (safe drinking water). An example in FIG. 1 shows a backflow meter assembly device known as RPZ (Reduced Pressure Zone). The present invention backflow "Seatdriver" apparatus, is used to assist in the removal and to properly align the threads for a proper installation of vital valve "seat" parts for the RPZ meters. RPZ meters prevent cross connection of non-potable water and potable water. These devices prevent any backwards siphoning and/or reverse flow of water. They require an annual state testing to insure that all the many internal components are working properly. Repairing the valve seat on backflow meters is when the need for a better apparatus tool the present invention "Seatdriver" apparatus came into creation.

In the industry of Backflow Meter Assemblies, backflow repair tools are almost non-existent. Even, the manufacturing companies who manufacture the RPZ meters (like the Wilkins models RPZ 950 and 975). Sells a vague tool which they label as an "Optional Seat Removal Tool". Note that it is only a "removal" seat tool not a replacement or installation seat tool! So, the backflow repair technician persons who will need to replace the CV's or RV's seat parts for these meters are on their own when it comes to a "tool apparatus" that can align the threads of a seat part to threads of a RPZ meter while they are out of site while properly installing these worn or damaged seat valves parts without cross threading them without the aid of an tool apparatus. In (FIG. 11 #114) it shows the RPZ meters treads will be out of site during an install. The present invention is to be a removal, install and most import be an alignment tool to prevent cross threading during the install or replacement of replacement seat valves.

BRIEF SUMMARY OF THE INVENTION

The present invention incorporates the use of two novel seat heads slots connected to a both ends of a novel driver handle. The novel seat heads and the novel channels are incorporated into the novel driver handle. By incorporating the seat heads and the channels into the handle this creates an all in one apparatus which provides easy removals and installs. These three combined component's works together to create the criterial thread alignments and to keep the replacement seats valve parts on the driver head during the install or replacements of the valve seat parts in RPZ meters.

BRIEF DESCRIPTION OF THE DRAWINGS

Some embodiments of the present invention are illustrated as an example and are not limited by the figures of the accompanying drawings or images, in which references may indicate similar elements.

FIG. 1 is an exploded view assembly drawing of both the check valve seat part and the relief valve seat part with the present apparatus herein called the "Seatdriver".

FIG. 2 is an exploded view of an prior art assembly drawing showing its handle, driver, and screw head types and comparing it to FIG. 1's current apparatus's handle, driver and seat heads.

FIG. 4 depicts a section cut view of an RPZ meter used in the backflow industry showing the challenge and where the replacement valve seat parts are located within a RPZ meter using the present invention, FIG. 5 depicts a transparent side view of FIG. 4 of a RPZ meter and shows the present apparatus functioning within an standard RPZ meter

FIG. 8 depicts a side view of a vertical position of the present apparatus to demonstrate the valve seat part doesn't fall off the apparatus due to gravity.

FIG. 9 depicts a bird's eye view of the present apparatus that shows the profile of the seat head part is incorporated throughout the apparatus FIG. 10 depicts the end of a birds eye view, of the drawings from FIG. 4 RPZ part showing the current apparatus removing a relief valve seat part.

FIG. 11 depicts a birds eye view of the FIG. 4 internal components of a RPZ meter and shows the valve seat parts remains on the present apparatus during the install in-spite gravity FIG. 12 depicts and birds eye view of FIG. 4 an RPZ meter showing the challenge of the valve seat part being out of sight during the install.

DETAILED DESCRIPTION OF THE INVENTION

In describing the invention, let it be understood there will be a number of steps and techniques disclosed. For the sake of time and clarity the description will refrain from repeating repetitive steps and techniques and claims. Keeping in mind specification and claims should be read with the understanding of the scope of the invention and claims.

In the presenting invention, it is intended to specify the description and specification of the current apparatus. Many of the claims and descriptions will be illustrated and represented by preferred means and methods of image(s), figures (FIG.), drawing(s), and models using an appendix of sequenced numbers throughout all FIGURE sheets produced and illustrated below.

The picture in FIG. 1 depicts the present invention apparatus, here in known as a seatdrive. In (FIG. 2 #8) is a replacement part know in the industry as a seat valve part and 5 is known as a relief valve part that must be repaired or replaced do to wear or damage Also seen in (FIG. 1) is the current invention the seatdriver functioning as one apparatus that functions much as the in (FIG. 2, #20) the typical screwdriver shown in (FIG. 2) Whereas the regular (FIG. 2 #20) and the current apparatus will have in (FIG. 1,2 #1) the handle and (FIG. 1,2 #4) the driver head). But in (FIG. 2'#2) the shank on the screwdriver is incorporated into the (FIG. 1 #1) the handle of the current invention apparatus. This allows the current apparatus to have two driver heads one on each end of the apparatus (FIG. 1 #4). Allows for two different replacement seats to use one apparatus the seatdriver for a single RPZ meter without multiple tools. (FIG. 1,6,7,8 #6 is the stop ring which allows the (FIG. 1,6,7,8 #8) seat part to rest against it during the install which keeps the threads on the (FIG. 1,6,7,8 #8) seat valve part to maintain aligned to the manufactures RPZ's internal threads. In (FIG. 1, #5) the relief valve will rest against the (FIG. 1, #1) the handle for its proper thread alignment. Current RPZ manufactures have an apparatus name "Optional Seat Removal Tool". Which intentionally is not label either as install or alignment tool.

Figure 3:
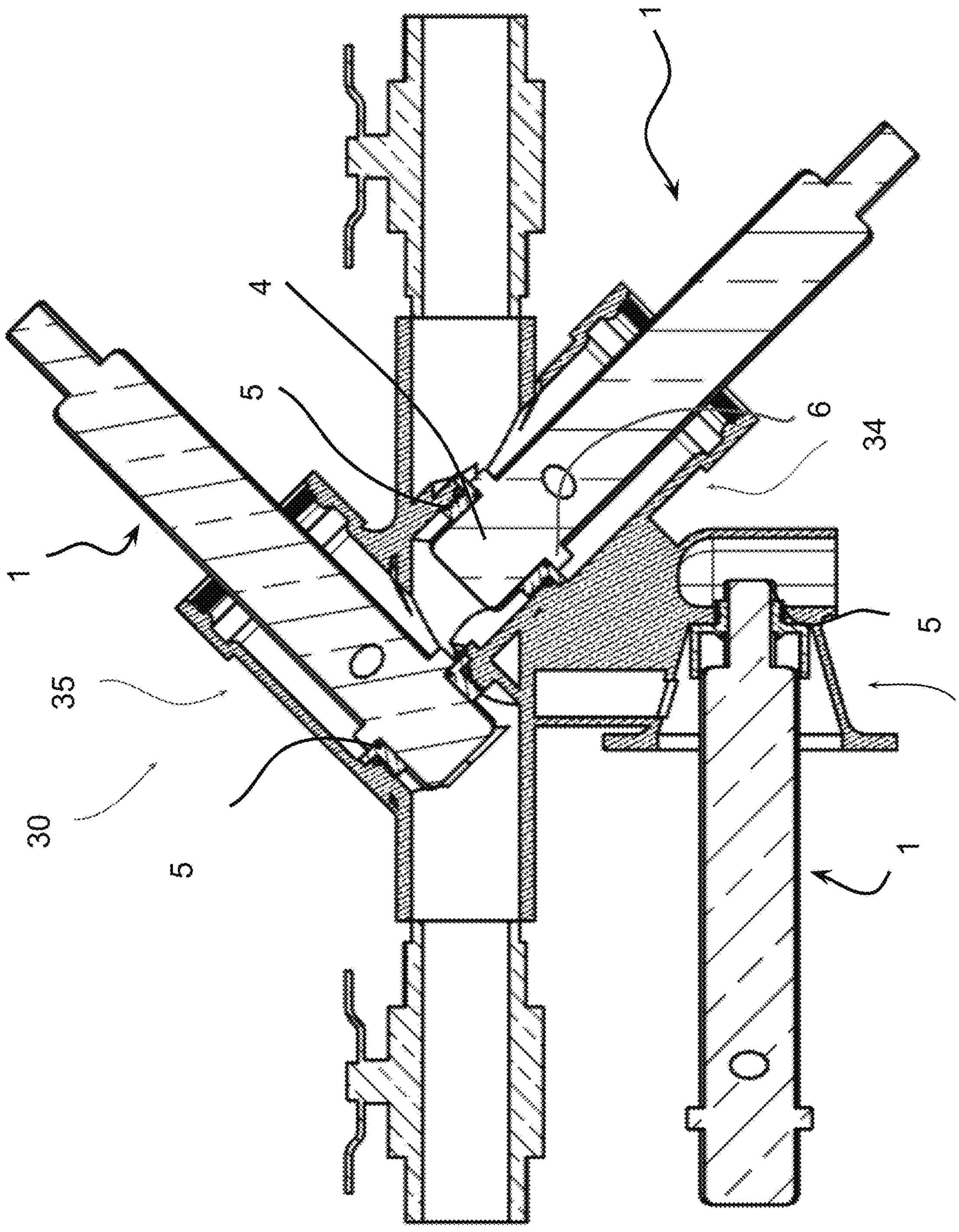
FIG. 3 depicts a front view of an sectional drawings of an RPZ backflow of (FIG. 4) meter used in the industry and shows the current apparatus-within the check valves and within the relief valves of an RPZ meter.
Figure 13:
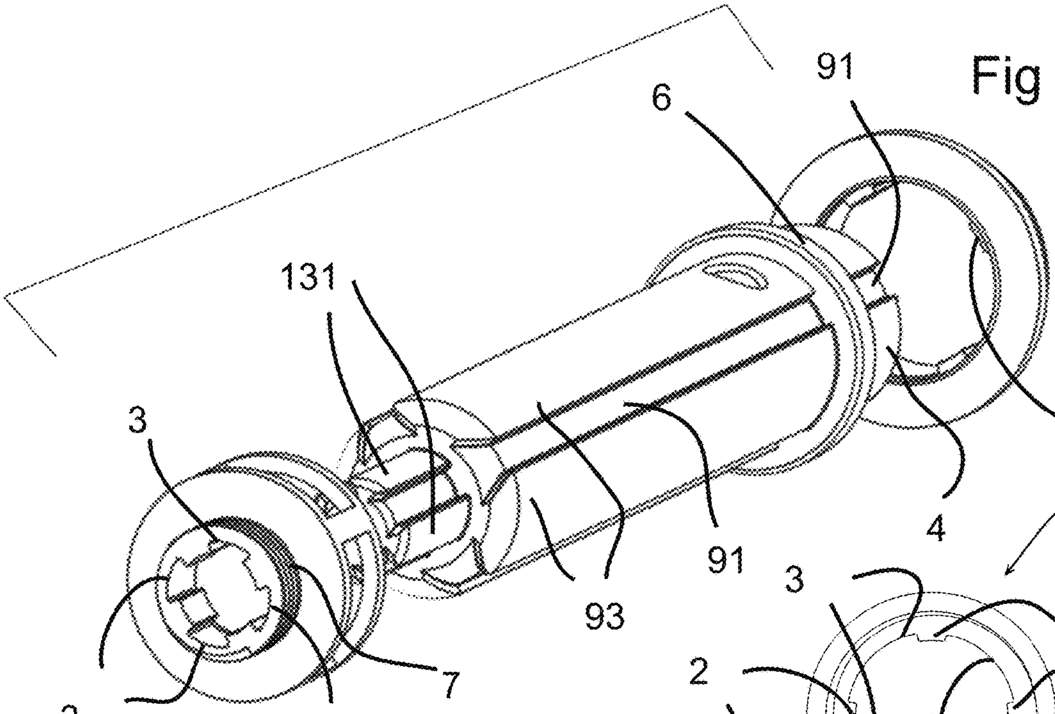
FIG. 13 depicts an exploded view and shows the assembly of the present apparatus with the relief valve seat part and the check valve seat part meet the stop ring to the seatdriver apparatus.
Figure 14:
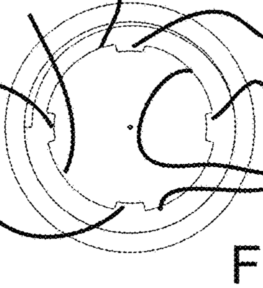
FIG. 14 depicts a top view of a replacement check valve seat part profile's and its four extrusions and its four channels creating the seats profile.
Figure 15:
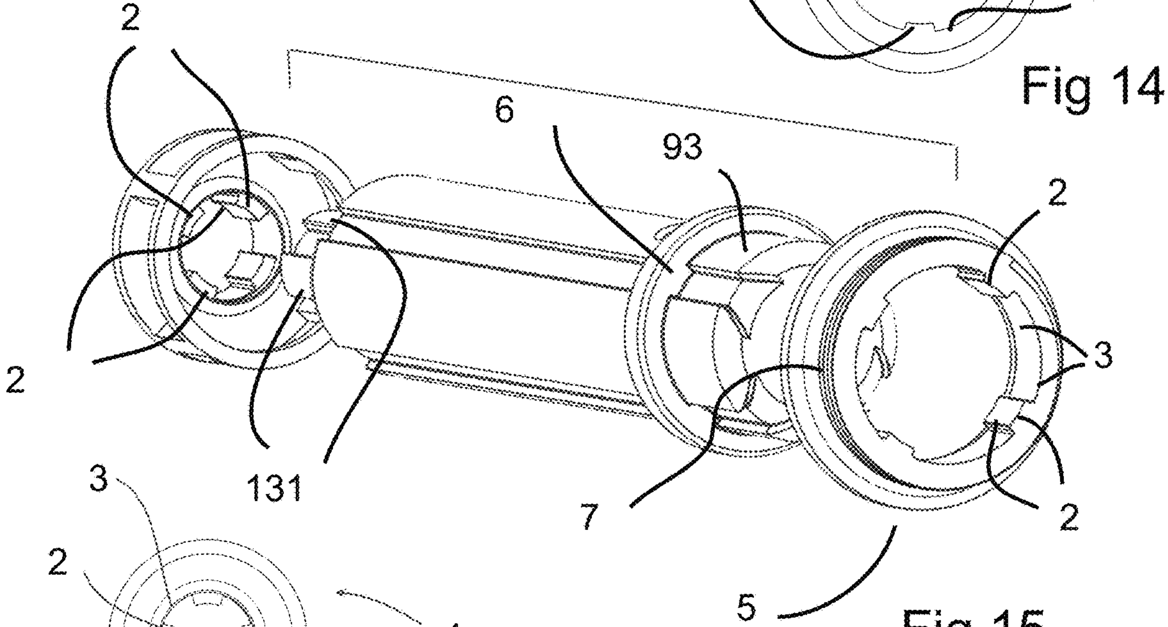
FIG. 15 depicts an exploded view assembly of a replacement relief valve seat part aligning to the channels on the present seatdriver apparatus.
Figure 16:
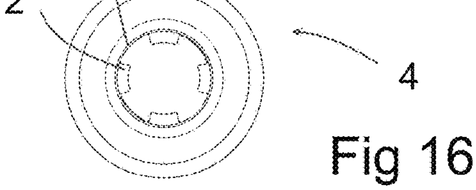
FIG. 16 depicts a top view of a replacement relief valve part profile and its four extrusions and its four channels creating the seats profile.

The present invention backflow "Seatdriver" combines both the novel "Screw head slot" in (FIG. 1, #4) with the novel handle in (FIG. 1, #1) which is the mechanical "Driver" which is incorporated into the current invention as a hand held driver apparatus for removing, aligning and installing the Valve Seats for the Wilkins, Febco, Apollo and other models. See the example models depicted in (FIG. 3, 4,5). The handheld driver apparatus can be produced with the 3D process of plastic filaments, injection molding, CNC machining and cold forming. The current handheld backflow "Seatdriver" apparatus conforms to the backflow meters such as Wilkins, Febco & Apollo or any company that uses the same '4 tooth protrusion locking screw head slot' seats seen in (FIG. 13,14 15, 16, #2). However, the intent of this invention apparatus' purpose is not to be limited to this one size for backflow valve seat-removal and installations. This apparatus transcends to all models and sizes using the cross-section or profile of the manufactured SEAT PART. As shown in (FIG. 1, #2, #3), and (FIG. 14-16 #2, #3)

The intent of the present invention is to be defined by its unique function and, application method(s). The current device on the market for removing and installing valve seats is clearly ill defined, dubious, vague, and delusive as to its applications. Trying to hold onto a seat part as seen in (FIG. 11, #5) and allow for an install 2-3 inches deep (FIG. 5, #50) within the brass RPZ meter. This is the downfall of the few available backflow tools current being used in (FIG. 5, 10, 11, 12). The present invention will try to establish a clear, distinct, clearly defined and credible method for the removal, aligning of the threads and for install of the valve seats on backflow meters without cross threading.

In the present invention a defined and compatible Type of Screw Head "Slots" is seen in (FIG. 1, #23, #2, #3) and in (FIG. 1,6,8, #4) a defined "seat heads" is established, which will receive the seats parts seen in (FIG. 1, #5, #8). These slots seen in (FIG. 1, #23, #2, #3 define the seat head for the current invention apparatus and will be referenced henceforth as the "Seat Head". The present invention will also try to establish a distinct and apparent "Driver" also known as the "handle" seen in (FIG. 1, 2,3,5,6,7,8,11,12, #1).

The now referenced "Seat Head" is much like the Phillips Head or Robertson Head as seen in (FIG. 2 #23) and it is a "Type" of Screw Head Slot used for a "screwdriver". However, in the current "seatdriver" apparatus, the "Screw Head" Slot is called a "Seat Head" Slot seen in (FIG. 1, 2, 8, 13 #4) which will receive the screw part, known as the "SEAT valve part" seen in (FIG. 1, #5, #8). The profile of the Seat Head is now defined as a tapered 4 grooved notches seen in (FIG. 1, 13,14,15,16 (#2) also seen as inter & outer channels in (FIG. 9, 13, 15, #93, #91, #131). These channels are also created onto the handle to allow for stored of extra seat parts as seen in (FIG. 7, #70, #71) and to increase grip for the handle.

The Type of Screw Head (FIG. 1, 2, 8 #4) now referenced as "Seat Head" is clearly a screw. It can be described as being much like a thermos bottle screw cap. The threads (FIG. 13, 14, 15 #7) are on the outside diameter (OD) connecting to an inside diameter (ID) thread but thermos having its "Driver" handle connection on the outside of the lid. The current Valve Seat part used in the present apparatus has the same OD threads seen in (FIG. 1, 2, 8 #7) connecting to ID threads in (FIG. 11, #114), however there is not a hand held "Driver" which is available and matches the our seat valve part slot. Just like all screws it will require a screw head slot be identified and fitted with a driver apparatus as seen in (FIG. 1, 2, #1 & #22). This is the purpose for the "Seatdriver" apparatus. It is designed to join to the seat valve and properly align it to the brass threads on the meter in (FIG. 11, #114) This apparatus works similar to other types of screw heads slots which have different applications such as in (FIG. 2 #5) Robertson, Hex and Phillips. Screw heads are named after a person or function. Philips head has been named after its creator, Henry F. Philips. The Robertson head was named after the Canadian inventor P. L Robertson. (FIG. 2 #13) The current invention's seat valve part is unique in that it has no top groove for a slot. Its slot has to comes from the inside diameter section profile of the seat itself. This new novel "Seat Head" slot is now clearly defined and will be used in the "Seatdriver" apparatus in (FIG. 1,2 #4) head and by the seat parts inside profile (FIG. 1, #2, #3) from the seats (FIG. 1, #8, #5).

Another purpose of this present invention apparatus "Seatdriver" is to reduce the resistance to the "Cam-Out" effect (which is the driver slipping from a loose fit in the slot) this is very crucial in the aligning.

All screw types require a driver apparatus that can match the screw head slot and be inserted into the slot to produce mechanical force to remove the screw. The present invention 'Seatdriver" reduces the cam-out effect and produces more efficient torque force reducing damage to the valve seat part as apparent in (FIG. 2, #8, #5) as well as the tight fit seen in (FIG. 7, #71, #72) parts. The present apparatus "Seatdriver" connects the screw head, driver shaft, and the driver handle all together allowing a much greater crank torque force and reduces the cam-out effect. It is much like a 4 wheel drive truck versus a 2 wheel drive truck. By engaging all functioning parts into one apparatus the torque's hand crank power is increased which also reduces the cam-out effect. Creating better alignment of the thread during replacement or install of a seat part.

The market tool for removing the "Valve Seat" is clearly at best ill-defined and delusive in defining its "TYPE of SCREW HEAD SLOT" and matching it to an apparatus which can install the screw type "Valve Seat". The optional seat tool sold in the market provides limited hand torque and leads to increased "Cam-Out" effect during removal of the "Valve Seat".

Approximately 50 percent of valve seat repairs jobs done will done in a vertical downward position. It is crucial for the seat part to be aligned and held in place on the driver for proper installations especially since many installs are out of the line of sight. The present invention "Seatdriver" is a handheld driver much like a hand "screwdriver" (FIG. 2 #20). The present invention apparatus prevents the valve seat part from falling off even with the vertical gravity effect during installs as you can see in (FIG. 8, #7) This holding effect from the "Seatdriver" is accomplished by an extra 0.050 inch in diameter on the nominal of two of the diagonal outer channels of the "Seatdriver" apparatus profile seen in (FIG. 9,15, #93).

Figure 7:
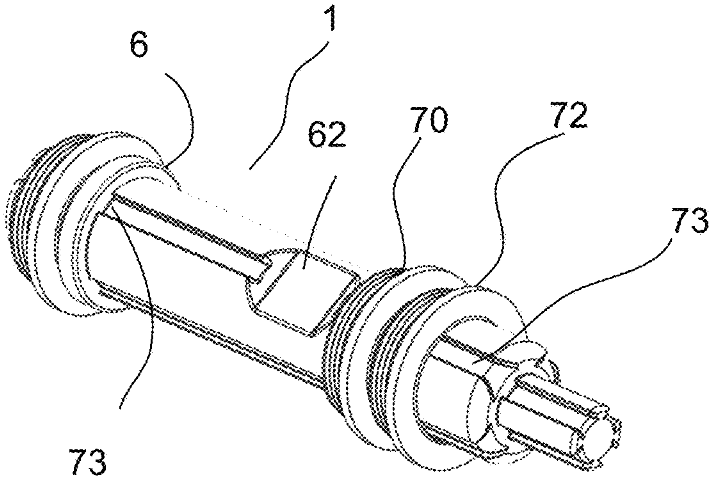
FIG. 7 depicts an isometric view of the present apparatus showing the ability to store other replacement seat parts and its matching grooves from the check valve (cv) seats, to the body and handle.

The present invention "Seatdriver" functions as a two in one device for both the check valve seats and the relief valve seat parts seen in (FIG. 1, #8, #5). The present invention apparatus has been configured with a stop ring feature seen in (FIG. 1,6,8,13,14, #6). This ring holds the seat part perpendicular to the backflow brass threads seen in (FIG. 11, #114) where the seats will be installed. This stop ring is key to reducing and/or stopping the misalignment of the valve seat threads while installing. The ring also maintains a set position of the seat part during the out of sight time for installs. The handle apparatus length is configured to provide enough space outside the cylinder of the meter for a person's hand to hold the "Seatdriver" apparatus as seen in (FIG. 5, #51). The handle's channel grooving provides grip and also allows for storage of additional spare seat parts seen in (FIG. 7, #70, #72). This present all in one apparatus provides greater torque leverage for tightening and loosening the seat parts without the assistance of other leverage tools.

Figure 6:
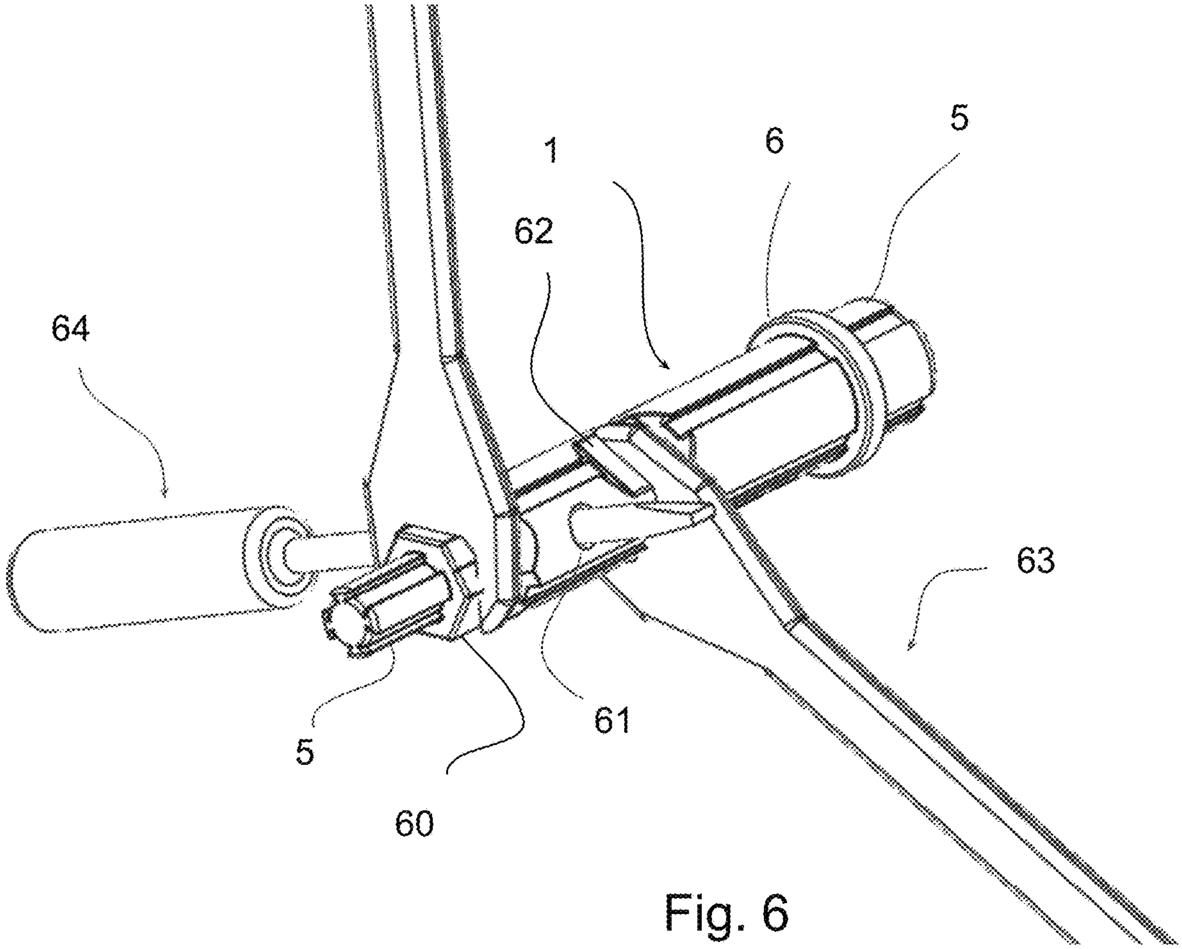
FIG. 6 depicts an isometric view of the present apparatus and how and where tools will be used for tighten and losing the present apparatus.

The "Valve Seat Part" profile seen in (FIG. 1, #5, #8) will herein be used as the novel screw slot for the present invention's "Seatdriver" apparatus. This screw head slot will not be limited by size and will change in size to accommodate the present apparatus to be used for any backflow meters using the defined "Seat Head" in this current apparatus. It will not change in function or application or method. The seatdriver is hand held apparatus fitted with slots along the apparatus for additional tightly and loosing torque if it becomes necessary as seen in (FIG. 6, #60-#64).

The invention claimed is:

1. A seatdriver apparatus for a check valve seat having four first size check valve tooth protrusion head slots and a relief valve seat having four second size relief valve tooth protrusion head slots, the apparatus comprising:

a handle including a grip length extending from a check valve end to a relief valve end;

the check valve end including four first size channel parallel grooves sized to mate with the first size check valve tooth protrusion head slots;

the relief valve end including four second size channel parallel grooves sized to mate with the second size relief valve tooth protrusion head slots; and the four first size channel parallel grooves extending along the grip length, wherein the grip length provides storage for one or more check valve seats.

2. The apparatus of claim 1, further comprising:

the handle sized to frictionally retain at least one valve seat selected from a valve seat group, the valve seat group consisting of the check valve seat and the relief valve seat.

3. A seatdriver apparatus for a check valve seat having an internal check valve profile and a relief valve seat having an internal relief valve profile, the internal check valve profile larger than the internal relief valve profile, the apparatus comprising: a handle including a grip length extending from a check valve end to a relief valve end; the check valve end including a check driving parallel profiled sized to mate with the internal check valve profile; the relief valve end including a relief driving parallel profile sized to mate with the internal relief valve profile; wherein at least one check valve seat is releasably secured to the check valve end and at least one relief valve seat is releasably secured to the relief valve end, and wherein the grip length provides storage for one or more check valve seats.

4. The apparatus of claim 3, further comprising:

the handle sized to frictionally retain at least one valve seat selected from a valve seat group, the valve seat group consisting of the check valve seat and the relief valve seat.

* * * * *